United States Patent Office 3,370,487
Patented Feb. 27, 1968

3,370,487
AUTOMOBILE OVERDRIVE CONTROL
Kenji Ohno, 10 1-chome, Hirayama-cho, Toyoda-shi, Aichi-ken, Japan, and Eiichi Kawai, Ogakieshataku, 41 Kamisawatari, Ogakie, and Hisashi Yonezu, 1 1-chome, Shows-cho, both of Kariya-shi, Aichi-ken, Japan
Continuation-in-part of application Ser. No. 415,090, Dec. 1, 1964. This application Mar. 27, 1967, Ser. No. 626,318
5 Claims. (Cl. 74—855)

ABSTRACT OF THE DISCLOSURE

An apparatus including a switch actuated by the accelerator pedal to kick down an overdrive transmission in response to a large torque demand and an electrical circuit effective to normally engage the overdrive above a first speed. A transistorized control effective above a second, higher speed to render the accelerator operated switch ineffective regardless of its position.

Figure 1:
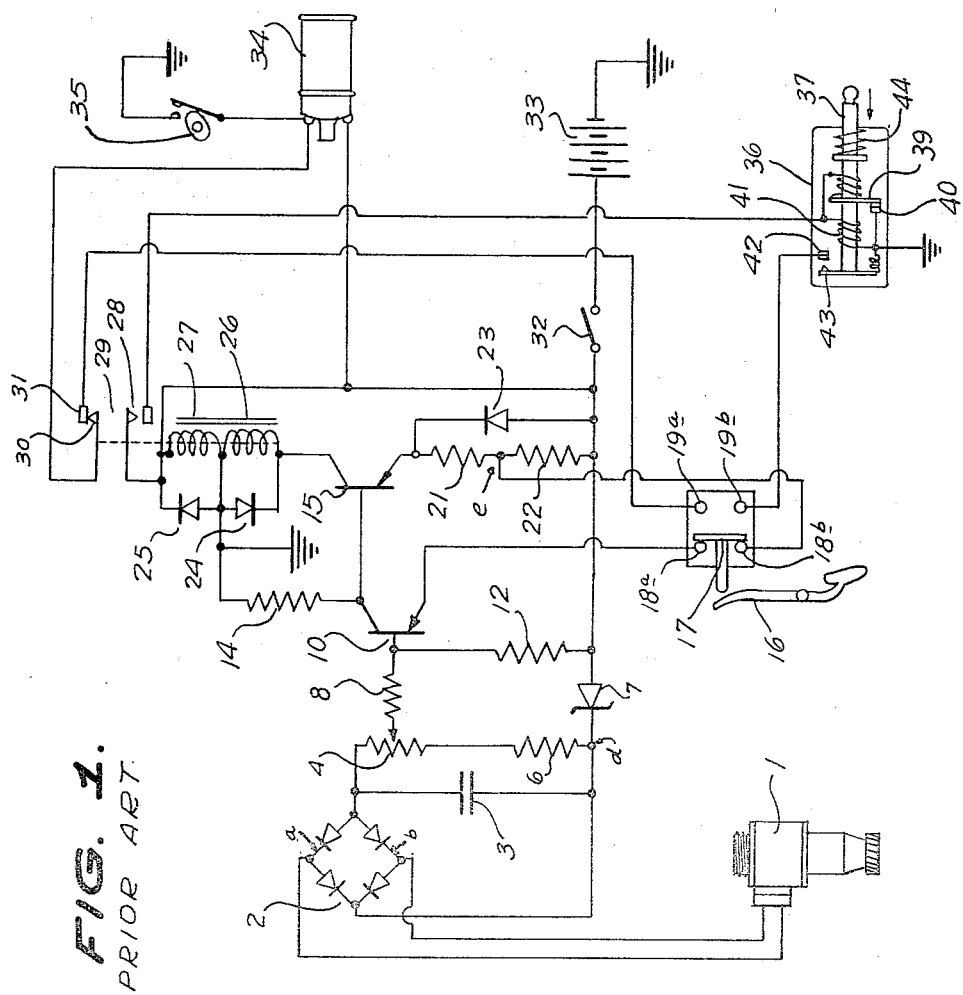

This invention relates to a new and useful automatic anti-kick down control assembly for overdrive control system, and more specifically to an automatic anti-kick down control system adapted to enable an overdrive transmission to remain in overdrive operation when the vehicle is travelling at a speed above a predetermined speed, for example, approximately 100 kilometers per hour, so as not to overrun and damage the engine.

The present application is a continuation-in-part of copending application Ser. No. 415,090 filed Dec. 1, 1964.

Many types of vehicles are provided with overdrive transmission in order to lower the engine speed while the vehicle is travelling at high speeds so as to increase the efficiency of the vehicle. And when the overdrive gear ratio is used and the speed of the vehicle is permitted to fall below a certain minimum, the load on the engine of the vehicle becomes excessive at that engine speed inasmuch as the efficiency and power of the engine are not high at the low engine speed, and as a result the efficiency of the vehicle drops off greatly. Therefore, there is provided some type of automatic kick down control system which would operate to kick down the overdrive transmission to the lower gear ratio thereof when the vehicle is travelling at a speed slower than a predetermined speed established as a lower limit of the efficiency of the engine.

However, when the vehicle is travelling at a high speed above the speed of approximately 100 kilometers per hour and the overdrive gear ratio is used, the engine speed of the vehicle is sufficiently high, and when in this condition the driver depresses the accelerator pedal deeply to its maximum stroke for acceleration, some type of kick down control system will operate to kick down the overdrive transmission to the lower gear ratio, then the engine may be forcibly over run, inasmuch as the efficiency and power of the engine are not high at a very high engine speed, and as a result the efficiency of the vehicle drops off greatly. In addition to a reduction in economy and efficiency, the over running of the engine results not only in causing the engine damage but also is very dangerous to the driver because of sudden engine braking while accelerating.

It is therefore highly desirable that there should be provided some type of automatic anti-kick down control system which would operate to kick down the overdrive transmission to the lower gear ratio at the comparatively low speed of the vehicle then effective, and not to kick down at the high speed above approximately 100 kilometers per hour.

It is therefore the principal object of this present invention to provide an automatic anti-kick down control system which operates to kick down below a predetermined speed, for example, of approximately 100 kilometers per hour, and not to kick down at speeds above that speed of the vehicle.

Figure 2:
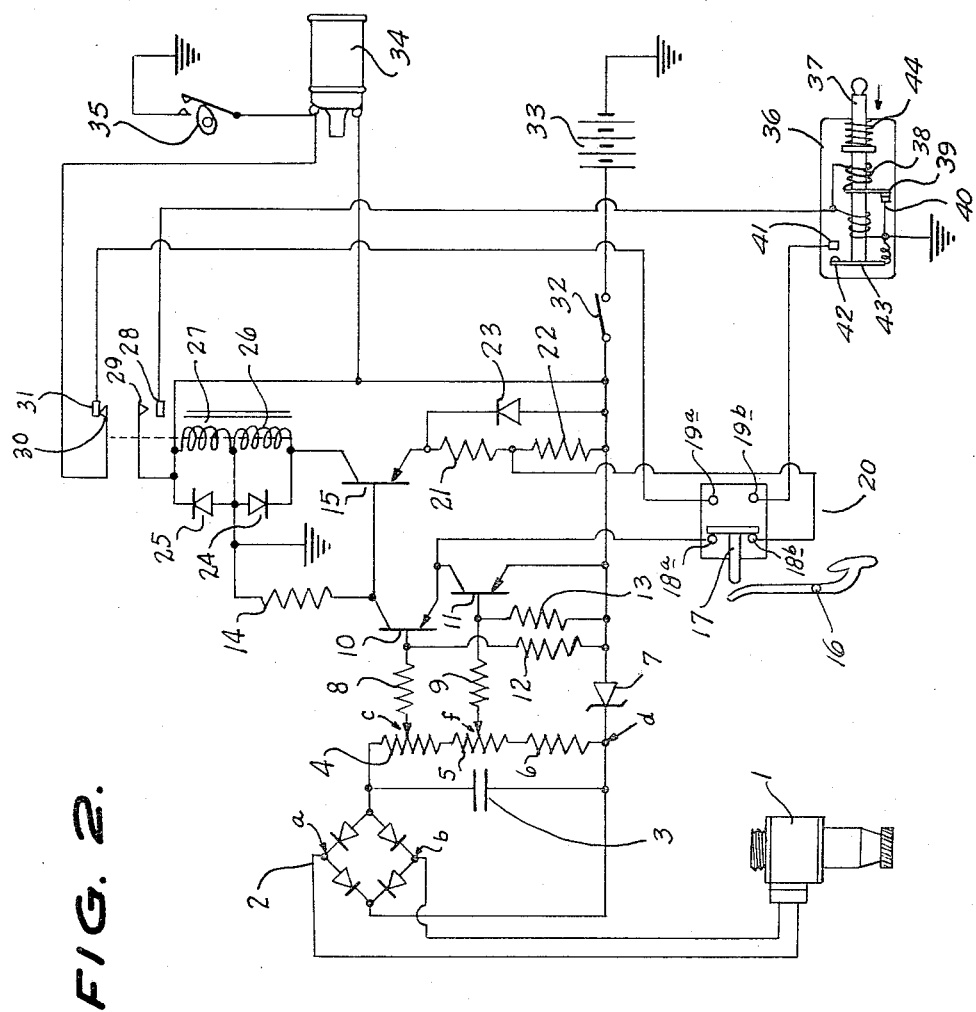

Other objects and advantages which will become subsequently apparent reside in the details of construction and operation as more fully hereinafter described and claimed when read in connection with the accompanying drawings, in which:

FIG. 1 is an electrical wiring diagram of the overdrive system of the prior art employing the conventional electrical kick down control system; and FIG. 2 is an electrical wiring diagram of the novel overdrive system employing the automatic anti-kick down control system according to this present invention.

In these drawings and description, the same symbols denote the same or corresponding parts.

Referring to FIG. 1, an electrical wiring diagram of an overdrive system of the prior art employing a conventional electric control system is shown in FIG. 1, in which a signal generator 1 generates a voltage proportional to the speed of the vehicle. An overdrive solenoid generally designated by 36 is provided and includes a movable core armature 37 and also includes an actuating winding 38 at one of its ends which is connected to a contact 28 and its other end is connected to a movable contact 39 and a holding winding 41. The actuating winding 38 is provided with a pair of contacts 39, 40, while are closed upon axial left displacement of core armature 37, and the holding winding 41 is permanently grounded at its one end with the said contact 40, and the other end is connected with the said contact 28.

The solenoid 36 is also provided with another pair of contacts 42, 43 which are closed on axial right displacement of the armature 37. The contact 42 is connected to a fourth contact 19b of a double pole double throw kick down switch 20, and the contact 43 attached to the armature 37 is permanently grounded. The double-pole double-throw kick down switch 20 includes first and second contacts 18a and 18b normally bridged by a bridging element 17. The accelerator pedal 16 of the vehicle is mounted for engagement with the bridging element 17 to move the latter to the right from engagement with the contacts 18a and 18b and into engagement with third and fourth contacts 19a and 19b.

A rectifier 2 rectifies an alternating voltage from the signal generator 1 and supplies a direct voltage to a tapped variable resistor 4 and a fixed resistor 6. A condenser 3 filters a pulsating D.C. voltage to become a perfect D.C. unvarying voltage. The rectifier 2 and the resistors 4 and 6 are connected in series as shown. The intermediate slideable tap terminal c of the resistor 4 is connected to the base of a transistor 10 through a resistor 8. A resistor 12 provides temperature compensation of the transistor 10. A zener diode 7 is connected between the said resistor 6 shown by d (negative terminal) and the said temperature compensating resistor 12.

A resistor 14 is connected as the load of the transistor 10, and resistors 21 and 22 are the emitter resistors of a second transistor 15. The resistor 22 is also the emitter resistor of the transistor 10. The base of the second transistor 15 and the collector of the first transistor 10 are connected with each other, and the emitter of the transistor 10 is connected to the first contact 18a of the said kick down switch 20, and the connecting common point of the two resistors 21 and 22 denoted e is connected to the second contact 18b of said switch 20. A winding 26 is the load of the transistor 15 and another winding 27 is reversely wound on the same magnet core with the said magnet winding 26. These transistors 10 and 15 as well as the resistors 14, 21 and 22 and the winding 26 form a Schmitt circuit having a hysteresis effect.

A silicon diode 23 having a sharp diode characteristic is connected in parallel with the resistors 21 and 22, and serves to keep the potential of the emitter of the transistor 15 approximately constant without being affected by fluctuation of the power source voltage so as to stabilize the range of hysteresis. Diodes 24 and 25 are connected to the respective ends of the relay coils 26 and 27, respectively, which serve to absorb the reverse voltage generated in the coils 26 and 27 when current ceases to flow through them, so as to protect the transistor 15 from damage. The two relay windings serve to control movement of the two pairs of contacts 28, 29 and 30, 31. The contacts 28, 29 which are normally open, consist of a movable contact 29 connected to a plus terminal of a storage battery 33 through a switch 32, and a fixed contact 28 connected to the actuating winding 38 and to the holding winding 41 of the said solenoid 36, as described hereinbefore.

Other contacts 30, 31 which are normally closed consist of a movable contact 30 connected to the negative terminal of an ignition coil 34 of the vehicle, and also of a fixed contact 31 connected to the said third contact 19a of the kick-down switch 20. The positive terminal of the silicon diode 23 and one end of the winding 27 are connected to the positive terminal of the battery 33 through the switch 32. The input terminals a and b of the rectifier 2 are connected to the signal generator 1. One end of a circuit breaker of the vehicle designated 35 is connected to the negative terminal of the ignition coil 34, and the other end of the circuit breaker 35 is permanently grounded. The positive terminal of the ignition coil 34 is connected to the positive terminal of the battery 33 through the switch 32 as shown.

The structure as described above with reference to FIG. 1, constitutes a part of a conventional overdrive control system. In operation, when a vehicle speed rises and reaches a predetermined speed $V_1$ such as 40 kilometers per hour, the voltage impressed between points c and d on resistors 4 and 6 by the signal generator 1 generating voltage in proportion to the vehicle speed, will reach a value high enough to make the Zener diode 7 conductive, so that the base current of the transistor 10 will flow through the resistor 22, the second contact 18b, the contact bridging element 17, the third contact 18a of the kick down switch 20, the emitter to the base of the transistor 15, and the resistor 8. The transistor 15 conducts current flowing through the resistor 14 to increase the terminal voltage of the resistor 14. Consequently the base voltage of the transistor 15 becomes as large as the supply voltage from generator 1, so that the transistor 15 is cut off and the current flowing through the relay winding 26 is stopped.

The resultant current flowing through the other winding 27 of the two relay windings 26 and 27 causes closure of the relay contacts 28 and 29, completing the circuit comprising the battery 33 and the holding winding 41 as well as the actuating winding 38. Energized by the heavy current flow, the actuating winding 38 moves the solenoid core armature 37 to a closing position to the right in the direction opposite to that indicated by an arrow in FIG. 1, and actuates the overdrive transmission to move into the overdrive position. As the actuating winding 38 completes the movement of the core armature 37 to the right, it opens the grounding contacts 39 and 40 of the actuating winding 38 by moving the contact 39 away from the contact 40. Inasmuch as the holding winding 41 remains connected to the battery, the core armature 37 is held in the closing position to which it has been moved by the actuating winding 38.

In case where the vehicle is running at a speed greater than the above-mentioned speed $V_1$, the contacts 28 and 29 are left closed for keeping the transistor 10 conductive so that the system is kept in the overdrive transmission state.

When the vehicle is slowed down to the speed $V_1$, the transistor 10 is still kept conductive by virtue of the hysteresis effect of the Schmitt circuit, including transistors 10 and 15. When the vehicle is further slowed down to a speed $V_1'$, for example, of 35 kilometers per hour, the Zener diode just becomes non-conductive so as to deenergize the transistor 10, resulting in making the transistor 15 conductive so as to energize the relay winding 26, whereby the contact 29 is released from the contact 28. When the contacts 29 and 28 are separated, the holding winding 41 of the solenoid 36 is de-energized so that the core armature 37 is attracted to the left in the direction as shown by the arrow in FIG. 1, by the action of the spring 44, whereby the vehicle is brought into a condition out of the overdrive transmission system, having a lower gear ratio.

Further referring to the prior art arrangement of FIG. 1, when the vehicle is travelling on the overdrive transmission condition and the accelerator pedal 16 is depressed to its maximum position to move the bridging element 17 from engagement with the contacts 18a and 18b and into engagement with the contacts 19a and 19b, the transistor 10 is caused to be cut off. Consequently, current flows through the relay winding 26 because of the conduction of the transistor 15. The current flowing through the two relay windings 26 and 27 separates the contacts 28 and 29 and closes the contacts 30 and 31. Inasmuch as the movable contact 29 has been opened, the circuit leading to the holding winding 41 is kept deenergized, so that the spring loaded actuator for the overdrive transmission moves the core armature 37 of the solenoid 36 to the left in the direction indicated by the arrow in FIG. 1. The actuating mechanism for the overdrive transmission is spring loaded and may not actuate the overdrive transmission to move out of the overdrive position until the torque of the engine is reduced to zero.

When the accelerator pedal 16 is depressed to its maximum position for kick down to simultaneously move the bridging element 17 from engagement with the contacts 18a and 18b and into engagement with the contacts 19a and 19b, the negative terminal of the ignition coil 34 is grounded by means of the closed contacts 30 and 31, the closed contacts 19a and 19b, and also closed contacts 42 and 43 which have been closed by the movement of the armature 37 to the closed position. It is necessary that the negative terminal of the ignition coil 34 be directly grounded, in order to release the torque of the engine so that the spring loaded actuator can move the armature 37 to the left in the arrow-indicated direction for returning the overdrive transmission to the low ratio operation.

In the new arrangement of the present invention, referring particularly to FIG. 2, the automatic anti-kick down control system in accordance with this present invention will now be described. Besides the elements of FIG. 1, another variable resistor 5 is inserted between the variable resistor 4 and the fixed resistor 6, which are shown in FIG. 1. A third transistor 11 is provided, of which the collector terminal is connected with the emitter of the transistor 10, and whose emitter terminal is connected with the positive terminal of the Zener diode 7, that is, with the positive terminal of the battery 33, through the switch 32. The base terminal of the transistor 11 is connected with the slideable contactor f of the variable resistor 5 connected across a resistor 9. For the temperature compensation for the transistor 11 there is inserted a resistor 13 between the base thereof and the emitter thereof.

The operation of the novel automatic anti-kick down control system in accordance with this present invention illustrated in FIG. 2, will now be explained. When the vehicle is running at a speed lower than a predetermined critical value $V_2$, for example, 100 kilometers per hour, the new system of FIG. 2 behaves similarly to the conventional one, of FIG. 1. When the speed of the vehicle has been increased up to the predetermined speed $V_2$ of 100 kilometers per hour, the potential difference impressed between the two points, $f$ and $d$, of resistors 5 and 6 has been raised up to a value which is higher than the breakdown voltage of the Zener diode 7 so that the transistor 11 becomes conductive. By virtue of this conductive state of the transistor 11, even if the bridging element 17 of the kick-down switch 20 is brought into contact with the third contact 19a and the fourth contact 19b, removing from the first contact 18a and the second contact 18b, by depressing the accelerator pedal 16 sufficiently deeply, the transistor 10 is kept conductive so that the contact 29 is closed with the contact 28 as they are, while the contact 30 is opened with the contact 31 as they were, while the vehicle is running at the speed of $V_2$ or higher. Therefore, the torque of the engine is not reduced so that the transmission is unlikely to be shifted to the low gear state from the overdrive state. During the time when the speed of the vehicle is lower than the predetermined speed $V_2$, the potential difference between the two points $f$ and $d$ of resistors 5 and 6 is lower than the breakdown voltage of the Zener diode 7. Therefore, the transistor 11 is kept in the non-conductive state. As long as the transistor 11 is non-conductive, the whole system is the same as the conventional one illustrated in FIG. 1 in structure and in behavior. The new operation occurs when transistor 11 becomes conductive.

It is easily understood from the foregoing description that the operation of the automatic overdrive control system is completely automatic and, when the vehicle speed is in excess of a determined speed as approximately 40 kilometers per hour, the automatic overdrive control system will actuate the overdrive transmission to its higher gear ratio and, when the vehicle speed is in excess of a determined value as 100 kilometers per hour, the said system will not actuate the overdrive transmission to its lower gear ratio even if the accelerator pedal is depressed to its maximum position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:
1. In combination with a motor vehicle including an ignition coil and an overdrive control system of the type including an electric automatic overdrive control circuit, having a first control resistor, a signal AC generator which generates an alternating voltage proportionate to the vehicle speed and is adapted to send a signal to said control circuit, a double pole double throw over-drive kick down switch comprising a first contact and a second contact connectable with each other by a bridging element, and a third contact and a fourth contact engageable with each other by said bridging element, a storage battery, said second contact being connected to the positive terminal of said storage battery through said first control resistor of said circuit, and an actuating solenoid having an actuating winding with a movable grounding contact, a holding winding with a permanent grounding contact, and a movable shorting grounding contact connected to said fourth contact of said kick down switch, said overdrive control circuit comprising a rectifier of which the input terminals are connected to said signal AC generator, a second control resistor connected between the output terminals of said rectifier in parallel thereto, said second control resistor comprising a first variable resistor and a first fixed resistor connected in series thereto, a condenser connected between the output terminals of said rectifier in parallel thereto, a Zener diode of which the negative terminal is connected to the negative terminal of said output terminals and the positive terminal is connected to the positive terminal of said battery, a first transistor and a second transistor, said first transistor forming a Schmitt circuit with said second transistor, a first base resistor, a second resistor, a third base resistor, the base of said first transistor being connected adjustably to said first variable resistor through said third base resistor, the emitter of said first transistor being connected to said first contact of said kick-down switch, the base of said second transistor being connected to the collector of said first transistor, and the emitter of said second transistor being connected to said battery through said first resistor and said third resistor connected in series thereto, a duplex relay including two magnet windings wound reversely to each other, one terminal of one of said two magnet windings being connected to the collector of said second transistor and one terminal of the other of said two magnet windings being connected to the positive terminal of said battery, and the other terminals of said two magnet windings being permanently grounded, a normally opened contact comprising a movable contactor connected to the positive terminal of said battery, and a fixed contactor connected to said actuating winding and said holding winding of said solenoid, and a normally closed contact comprising a movable contactor connected to the negative terminal of said ignition coil, and a fixed contactor connected to said third contact of said kick down switch, an automatic anti-kick down control system comprising a supplemental circuit including a second variable resistor connected between said first variable resistor and said first fixed resistor, and a third transistor of which the base is connected adjustably to said second variable resistor, the emitter is connected to the positive terminal of said battery, and the collector is connected to said emitter of said first transistor, whereby a kick down is avoided during the time when said motor vehicle is in a state of running at a speed higher than a predetermined high speed, said state being represented by the conductive state of said third transistor, while said motor vehicle is in the overdrive transmission state during running at another predetermined speed which is lower than said determined high speed.

2. An automatic anti-kick down control system in combination with a motor vehicle including an ignition coil and an overdrive control system as claimed in claim 1, which comprises said second variable resistor and said third transistor, said emitter of said first transistor being so connected as to be adapted to be electrically disconnected from the positive terminal of said battery by means of said kick-down switch, and said first transistor being adapted to be left in the state of being energized by virtue of said third transistor as long as the same is left in the state of being energized when said emitter of said first transistor has been electrically disconnected from the positive terminal of said battery, whereby a kick down is avoided during the time when said motor vehicle is in a state of running at a speed higher than a first predetermined high speed, said speed state being represented by the conductive state of said third transistor, while said motor vehicle is in the overdrive transmission state during running at another second predetermined speed lower than said first predetermined high speed, said overdrive transmission state being adapted for running at a speed greater than said other second predetermined speed.

3. An automatic anti-kick down control system in combination with a motor vehicle including an ignition coil and an overdrive control system as claimed in claim 1, which comprises a second variable resistor and a third transistor, the operative arm of said second variable resistor being adapted to be positioned for energizing said third transistor across said Zener diode when the speed of said motor vehicle becomes said first predetermined high speed, whereby a kick-down is avoided while said motor vehicle is in a state of running at a speed higher than said first determined high speed.

4. An automatic anti-kick down control system in combination with a motor vehicle including an ignition coil and an overdrive control system as claimed in claim 3, said first determined high speed being 100 kilometers per hour.

5. In a system for overdrive control of a motor vehicle for preventing undesired automatic kick down at undesired speed, a control circuit consisting of three resistors connected in series, two adjacent ones of said resistors being a terminal one and an intermediate one having a variable tap, a first transistor and a second transistor having their bases respectively connected to the variable taps on said terminal variable tap resistor and on said intermediate tap resistor, a third transistor having its base connected to the collector of said first transistor, a solenoid switch having actuating windings, switch means actuatable by an accelerator pedal and connected to selectively connect the emitter of said first transistor and the collector of said second transistor to the emitter of said third transistor, or to controlled contacts of said solenoid switch, a Zener diode connected between the outside terminal of the third untapped one of said three resistors and the emitter of said third transistor, a relay having a controlling winding connected to the collector of said third transistor and having controlled contacts connected to actuating windings of said solenoid switch, whereby undesired kick down control of the overdrive control system is prevented.

References Cited

UNITED STATES PATENTS

| | | | |
|---|---|---|---|
| 2,947,192 | 8/1960 | Prather | 74—472 |
| 2,971,395 | 2/1961 | Orr | 74—472 |
| 3,068,716 | 12/1962 | Van Dyke | 74—472 |
| 3,301,085 | 1/1967 | De Castelet | 74—472 |

ROBERT A. O'LEARY, *Primary Examiner.*

THOMAS C. PERRY, *Examiner.*